(12) United States Patent
Reck

(10) Patent No.: US 8,075,043 B2
(45) Date of Patent: Dec. 13, 2011

(54) FOLDING TOP WITH CHANGEABLE TENSION IN THE COVER

(75) Inventor: Philip Reck, Leonberg (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 192 days.

(21) Appl. No.: 12/691,317

(22) Filed: Jan. 21, 2010

(65) Prior Publication Data

US 2010/0187852 A1    Jul. 29, 2010

(30) Foreign Application Priority Data

Jan. 23, 2009  (DE) .................. 10 2009 005 995

(51) Int. Cl.
*B60J 7/12* (2006.01)
(52) U.S. Cl. ................ 296/107.12; 296/107.11
(58) Field of Classification Search ............ 296/107.01, 296/107.09, 107.11, 107.12
See application file for complete search history.

(56) References Cited

U.S. PATENT DOCUMENTS

| | | | |
|---|---|---|---|
| 3,090,646 A * | 5/1963 | Johnson ................. | 296/107.11 |
| 5,971,470 A * | 10/1999 | May et al. ............... | 296/107.09 |
| 6,491,334 B1 | 12/2002 | Anders | |
| 6,578,898 B2 * | 6/2003 | Rothe et al. ............ | 296/107.07 |
| 6,623,063 B1 * | 9/2003 | Grubbs et al. .......... | 296/107.09 |
| 6,729,673 B2 | 5/2004 | Hahn | |
| 6,966,599 B2 * | 11/2005 | Willard ................... | 296/107.12 |
| 7,014,246 B2 * | 3/2006 | Huedepohl .............. | 296/107.07 |
| 7,144,063 B2 * | 12/2006 | Garska ..................... | 296/118 |
| 7,517,000 B2 | 4/2009 | Liedmeyer et al. | |
| 7,661,750 B2 * | 2/2010 | Liedmeyer et al. ...... | 296/107.11 |
| 2002/0005653 A1 * | 1/2002 | Heselhaus et al. ....... | 296/107.07 |
| 2004/0119315 A1 * | 6/2004 | Huedepohl .............. | 296/107.07 |
| 2010/0187852 A1 * | 7/2010 | Reck ........................ | 296/107.12 |

FOREIGN PATENT DOCUMENTS

| | | |
|---|---|---|
| DE | 4104658 A1 | 8/1992 |
| DE | 102004042318 A1 | 3/2005 |
| EP | 0713796 A1 | 5/1996 |
| EP | 1064164 A1 | 1/2001 |

* cited by examiner

*Primary Examiner* — Glenn Dayoan
*Assistant Examiner* — Gregory Blankenship
(74) *Attorney, Agent, or Firm* — Brooks Kushman P.C.

(57) ABSTRACT

A folding top having changeable cover tension includes a cover stretched over a frame which is movable to move the cover between closed and opened positions. A tension bow is swung by a landau bar between a tensioning position and a non-tensioning position. Part of the rear portion of the cover is held in a narrow groove in the tension bow. The tension bow applies tension to this part of the cover when tension bow is in either of the tensioning or non-tensioning positions. Another part of the rear portion of the cover can slide into and out of a wide groove of the tension bow. The tension bow applies tension to this part of the cover when the tension bow is in the tensioning position but does not apply tension to this part of the cover when the tension bow is in the non-tensioning position.

20 Claims, 5 Drawing Sheets

FOLDING TOP WITH CHANGEABLE TENSION IN THE COVER

CROSS-REFERENCE TO RELATED APPLICATIONS

This application claims foreign priority benefits under 35 U.S.C. §119(a)-(d) to DE 10 2009 005 995.4, filed Jan. 23, 2009, which is hereby incorporated by reference in its entirety.

BACKGROUND OF THE INVENTION

1. Field of the Invention

The present invention relates to a folding top having a flexible cover such as a top cloth supported on a frame assembly and fastened at the rear to a tension bow in which tension provided to the cover by the tension bow is changeable.

2. Background Art

Folding tops (i.e., convertible tops) for vehicles have a flexible cover such as a top cloth that is stretched over a frame assembly. The frame assembly is movably connected to the vehicle body to move the folding top between closed and opened positions. The frame assembly has a tension bow which is fastened to a rear portion of the cover. The tension bow tensions the cover and lies on the vehicle body in taut position. The tension bow swings to release tension in the cover during closing and opening of the folding top. The cover remains solidly connected with the tension bow as the tension bow swings.

DE 41 04 658 C2 describes a folding top in which the ends of the tension bow have retaining angle pieces which form the boundary of a side window cutout of the cover. Elastic fabric straps under low tension connect lower edges of the side wings of the cover with the tension bow. This fastening achieves a change in the length of the cover during closing and opening of the folding top.

EP 1 680 300 B1 (corresponds to U.S. Pat. No. 7,517,000) describes a folding top in which the tension bow is fastened to a rear portion of the cover and pivots through different centers of motion according to its direction of movement (i.e., swinging up and down) in order to vary tension of the cover during closing and opening of the folding top. The tension bow undergoes motion in the vehicle's longitudinal direction, in addition to its swiveling motion, to reduce tension in the cover. When the folding top is closed, the tension bow is pushed opposite the direction of forward vehicle travel (i.e., rearwardly) to tighten the cover. The cover remains solidly connected with the tension bow.

EP 1 314 601 B1 (corresponds to U.S. Pat. No. 6,729,673) describes a folding top in which the tension bar is fastened to a rear portion of the cover. Lowering the tension bow tightens the cover. A landau bar having two parts arranged between a main control arm and the tension bow fixes the lowered position of the tension bow and thus maintains the tension of the cover.

SUMMARY OF THE INVENTION

An object of the present invention is a folding top (i.e., convertible top) having a flexible cover such as a top cloth supported on a frame assembly and fastened at the rear to a tension bow in which tension of the cover is reduced in a simple and economical manner during the closing and opening of the folding top such that the cover has proper storage behavior and can be orderly folded with a rear window arranged in the cover without additional means of assistance and in which tension of the cover is returned to its original state when the folding top is in either the closed position or the opened position.

In carrying out the above object and other objects, the present invention provides a vehicle folding top having changeable cover tension. The folding top includes a cover and a frame assembly. The cover is stretched over the frame assembly and the frame assembly is movable to move the cover between a closed position and an opened position.

The folding top further includes a U-shaped tension bow and a tensioning cable. The tension bow has a center bar, a pair of side legs, a wide groove running along the center bar, and a narrow groove running along each side leg, wherein the side legs are connected to the frame assembly. The tensioning cable runs along the tension bow and fixedly connected to a rear portion of the cover. The tensioning cable is connected at respective ends to the frame assembly.

The folding top further includes a landau bar. The landau bar is connected between the frame assembly and the tension bow. The landau bar swings the tension bow from a lowered position to a raised position as the cover moves from either the closed position or the opened position to an intermediate position between the closed and opened positions. The landau bar swings the tension bow from the raised position to the lowered position as the cover moves from an intermediate position between the closed and opened positions to either the closed position or the opened position.

A central area of the rear portion of the cover along with the tensioning cable connected thereto are removably held within the wide groove of the center bar of the tension bow such that the central area of the rear portion of the cover is connected to the tension bow when the tension bow is in the lowered position whereby the center bar of the tension bow applies tension to the cover when the cover is in either the closed position or the opened position and such that the central area of the rear portion of the cover is disconnected from the tension bow when the tension bow is in the raised position whereby the center bar of the tension bow does not apply tension to the cover as the cover moves between the closed and opened positions.

In an embodiment of the present invention, end areas of the rear portion of the cover along with the tensioning cable connected thereto are fixedly held within the narrow grooves of the side legs of the tension bow such that the end areas of the rear portion of the cover are connected to the tension bow regardless of whether the tension bow is in the lowered position or the raised position whereby the side legs of the tension bow apply tension to the cover irrespective of whether or not the cover is moving between the closed and opened positions.

In accordance with embodiments of the present invention, a folding top (i.e., convertible top) with changeable tension in the cover has a simple and economical design. The cover undergoes length compensation in the form of a longitudinal displacement when the folding top is opening from a closed position to prevent over-stretching of the cover. Reducing the tension in the cover enables reliable and reproducible storage of the cover. This is important because if the folding top is not optimally positioned when it is stored the cover can form uncontrolled folds and thus lead to substantial vibration and noise.

The tension in the cover is reduced by displacing areas of the rear portion of the cover over the tension bow.

When the folding top is in the closed position, the cover reaches around the rear edge of the tension bow so that the cover is kept under tension. When the folding top is opening, an area of the rear portion of the cover slides over the rear edge of the tension bow in the direction of the rear window of the cover. This happens over almost the entire width of the tension bow. This rear portion of the cover slides far enough over the tension bow in the direction of the rear window such that the cover is sufficiently long to form folds in the longitudinal direction and in the side areas of the folding top.

This makes it possible to do without additional controls and/or linkages for moving the rear window. The cover can be pulled into a desired folded position using corresponding tensioning devices such as elastic bands without allowing undesired creases, folds, or warps to form. This makes it possible to prevent the appearance of rub marks or butting edges when the folding top is closed. As such, it is possible to select the formation of folds in the folding top such that the folds are arranged in uncritical areas and cannot make contact with other parts of the folding top, the folding top compartment, or the folding top frame assembly.

The rear portion of the cover is fastened to the tension bar by a tensioning cable. The tensioning cable engages into a groove-shaped receptacle running along the bottom of the tension bow. In the movable area of the rear portion of the cover, the groove-shaped receptacle is shaped such that the tensioning cable can slide out of the receptacle during the closing and opening of the folding top. However, when the folding top is in either the closed or opened positions, the receptacle provides sufficient support for secure positioning of the tensioning cable in the movable area of the rear portion of the cover.

The tensioning cable is fastened to a control arm of the folding top transmission or to the C-pillar which move in the direction of the tension bow when the folding top closes or opens.

This displaces the rear lower edge area of the cover which corresponds to elongation/extension of the cover. Achieving a comparable effect entails expensive and complicated control arm transmissions that additionally move the tension bow in or against the direction of forward vehicle travel while the tension bow executes swinging movement. Such measures are expensive and require additional space.

Alternatively, in case the displacement of the cover is insufficient, the tensioning cable can be fastened through a spring to a control arm of the folding top transmission or the C-pillar so that additional displacement of the cover is provided when the tension bow swings.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
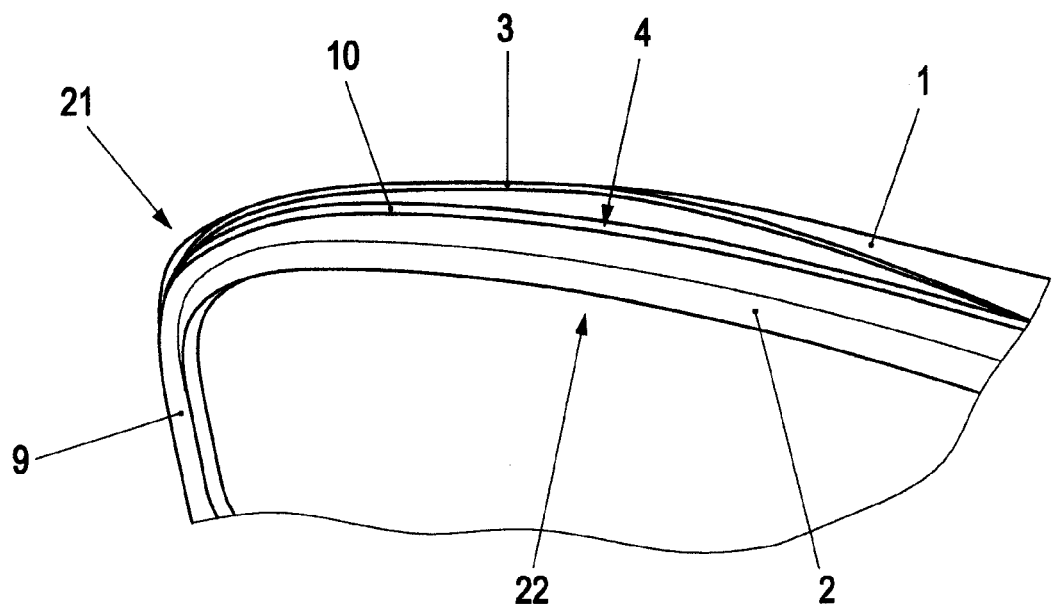
FIG. 1 illustrates the rear portion of a cover and a tension bow of a folding top in accordance with an embodiment of the present invention in which the tension bow is in a raised position during closing or opening of the folding top with a central area of the rear portion of the cover being displaced from a receptacle of the tension bow.
Figure 2:
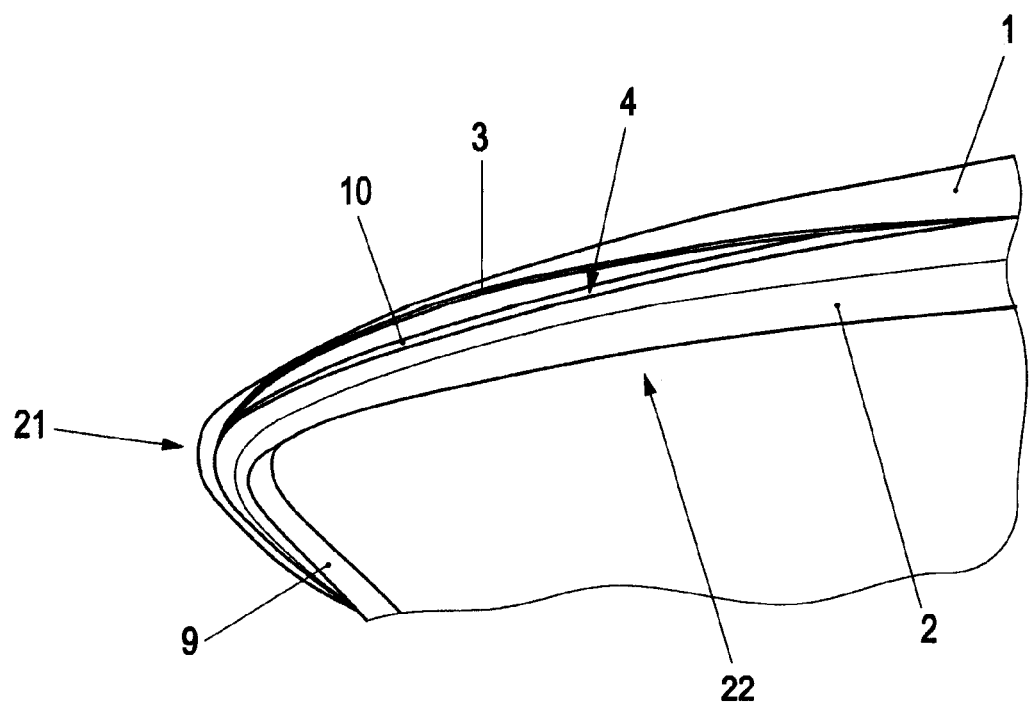
FIG. 2 illustrates the rear portion of the cover and the tension bow in which the tension bow is in a partly raised position during closing or opening of the folding top with the central area of the rear portion of the cover being partially displaced from the receptacle of the tension bow.
Figure 3:
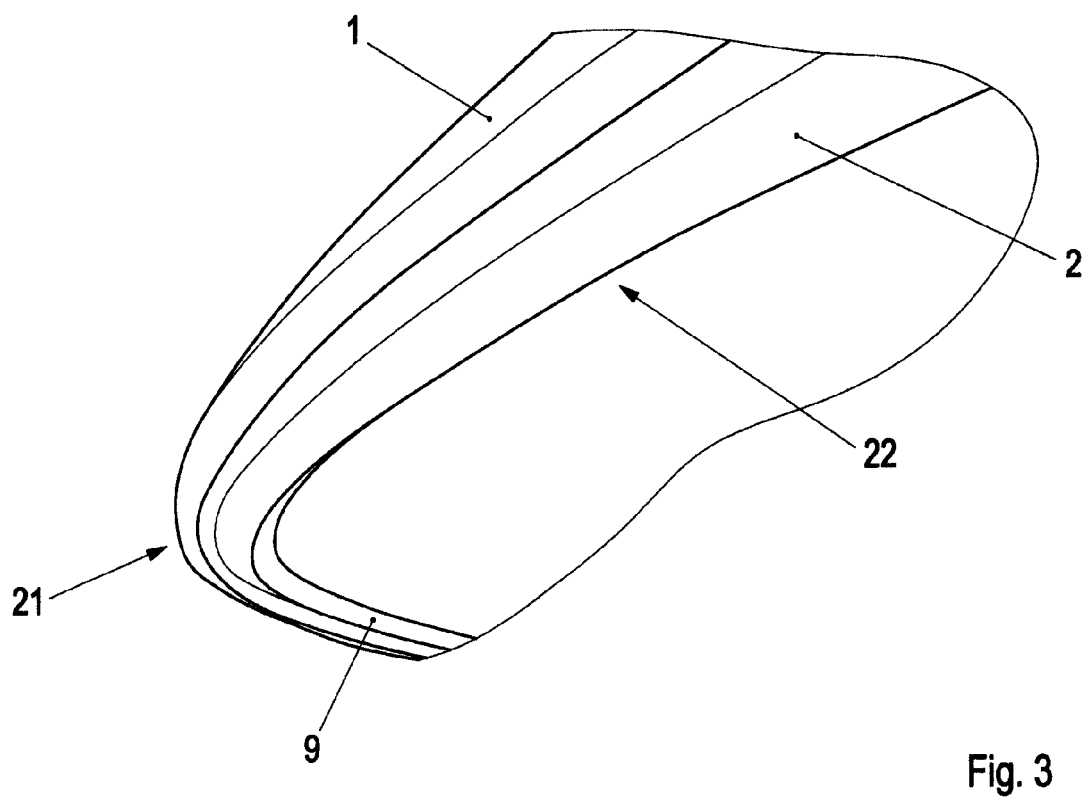
FIG. 3 illustrates the rear portion of the cover and the tension bow in which the tension bow is in a lowered position while the folding top is in a closed position with the entire rear portion of the cover being held in the receptacle of the tension bow.

Referring now to FIGS. 1, 2, and 3, a folding top in accordance with an embodiment of the present invention will be described. The folding top has a flexible cover 1 such as a top cloth that is stretched over a frame assembly. The frame assembly is movably connected to the body of a vehicle to move the folding top between a closed position and an opened (i.e., stored) position. In the closed position, the folding top extends over and covers a passenger compartment of the vehicle. In the opened position, the folding top is lowered and stored in a rear storage compartment of the vehicle.

The frame assembly includes a tension bow 2 located at the rear of the frame assembly. Tension bow 2 includes a groove-shaped receptacle (i.e., groove) 4 running along a bottom side of tension bow 2. A rear portion 3 of cover 1 can be held within receptacle 4 of tension bow 2 by a tensioning cable 10 for tension bow 2 to tension cover 1. In the closed and opened positions of the folding top, the entire rear portion 3 of cover 1 is held within receptacle 4 for tension bow 2 to apply tension to cover 1. During the closing or opening of folding top 1, tension bow 2 and the frame assembly move accordingly and a central area of rear portion 3 of cover 1 with tensioning cable 10 slide out from receptacle 4 while end areas of rear portion 3 of cover 1 with tensioning cable 10 are maintained within receptacle 4 such that the tension applied by tension bow 2 to cover 1 is reduced.

Tension bow 2 is U-shaped and includes a transversely extending center bar 22 and a pair of lateral side legs 9. Respective ends of center bar 22 merge with side legs 9 at corner areas 21 of tension bow 2. The ends of side legs 9 are pivotably fastened to parts of a control arm transmission of the frame assembly or to the main bearing of the control arm transmission (explained in greater detail with respect to FIGS. 6 and 7).

Along legs 9 and corner areas 21 of tension bow 2, rear portion 3 of cover 1 is solidly held in receptacle 4 of tension bow 2 such that the corresponding end areas of rear portion 3 of cover 1 cannot slide out from receptacle 4. As such, the end areas of rear portion 3 of cover 1 which are adjacent to legs 9 and corner areas 21 are maintained within receptacle 4 while the folding top is either closing or opening or while the folding top is in either the closed or opened position. To this end, receptacle 4 along legs 9 and corner areas 21 of tension bow 2 has a reduced slot-shaped opening 6 (see FIG. 4).

In contrast, along center bar 22 of tension bow 2, the central area of rear portion 3 of cover 1 is slidable into and out of receptacle 4 of tension bow 2. In particular, the central area of rear portion 3 of cover 1 slides out of receptacle 4 when the folding top is closing or opening. Conversely, the central area of rear portion 3 of cover 1 is held in receptacle 4 when the folding top is in either the closed position or the opened position. To this end, receptacle 4 along center bar 22 of tension bow 2 has an enlarged slot-shaped opening 7 (see FIG. 5).

In FIG. 1, tension bow 2 is in a raised position as a result of being swung up during the closing or opening of the folding top. The central area of rear portion 3 of cover 1 adjacent to center bar 22 of tension bow 2 is slid out of receptacle 4. The sliding out of the central area of rear portion 3 of cover 1 corresponds to a displacement of cover 1. In this position, the central area of rear portion 3 of cover 1 is pushed around rear edge 8 (labeled in FIG. 4) of tension bow 2 to the top of tension bow 2 (see also FIG. 5). Conversely, the end areas of rear portion 3 of cover 1 adjacent to legs 9 and corner areas 21 of tension bow 2 are solidly held within receptacle 4 (see also FIG. 4).

In FIG. 2, tension bow 2 is in an intermediate (i.e., partly) raised position as a result of the folding top being either in a partly closed position or a partly opened position. The central area of rear portion 3 of cover 1 adjacent to center bar 22 of tension bar 2 is partly slid out of receptacle 4. The slid-out central area of rear portion 3 of cover 1 is located at about rear edge 8 (labeled in FIG. 4) of tension bow 2. Conversely, the end areas of rear portion 3 of cover 1 and tensioning cable 10 adjacent to legs 9 and corner areas 21 of tension bow 2 are solidly held within receptacle 4 (see also FIG. 4).

The solid holding in receptacle 4 of the end areas of rear portion 3 of cover 1 which are adjacent to legs 9 and corner areas 21 of tension bow 2 ensures that the central area of rear portion 3 of cover 1 can get back into receptacle 4 when tension bow 2 is being lowered from a raised position.

The holding of the end areas of rear portion 3 of cover 1 in receptacle 4 is necessary as otherwise negative pressure acting on the closed folding top at high vehicle speeds could lift at least part of cover 1 up off tension bow 2 or unintentionally displace cover 1. The consequences of this are places that are not airtight, an unharmonious appearance, and substantial noise pollution. Furthermore, such a strain leads to stretching of cover 1 or can lead to damage in the form of tears in cover 1.

In FIG. 3, tension bow 2 is in a completely lowered position as a result of the closing or opening processes of folding top being completed (i.e., as a result of the folding top being either in the closed or opened position). In this position, the entire rear portion 3 of cover 1 (i.e., the central area and the end areas of rear portion 3 of cover 1) is held within receptacle 4 of tension bow 2. Here, the entire rear portion 3 of cover 1 reaches around rear edge 8 of tension bow 2 and is completely held within receptacle 4.

In the lowered position of tension bow 2 shown in FIG. 3, tension bow 2 applies relatively more tension to cover 1 than in the raised positions of tension bow 2 shown in FIGS. 1 and 2 as the entire rear portion 3 of cover 1 is connected to tension bow 2. As a result of this relatively more tension, air tightness between tension bow 2 and the folding top compartment cover as well as a perfect fit and a visually harmonious appearance are ensured. Conversely, in the raised position of tension bow 2 shown in FIG. 1, tension bow 2 applies relatively less tension to cover 1 as the end areas of rear portion 1 of cover are connected to tension bow 2 but the central area of rear portion 3 of cover 1 is disconnected from tension bow 2. Likewise, in the partly raised position of tension bow 2 shown in FIG. 2, tension bow 2 applies a relative intermediate amount of tension to cover 1 as the end areas of rear portion 3 of cover 1 are connected to tension bow 2 but the central area of rear portion 3 of cover 1 is partially disconnected from tension bow 2.

Figure 4:
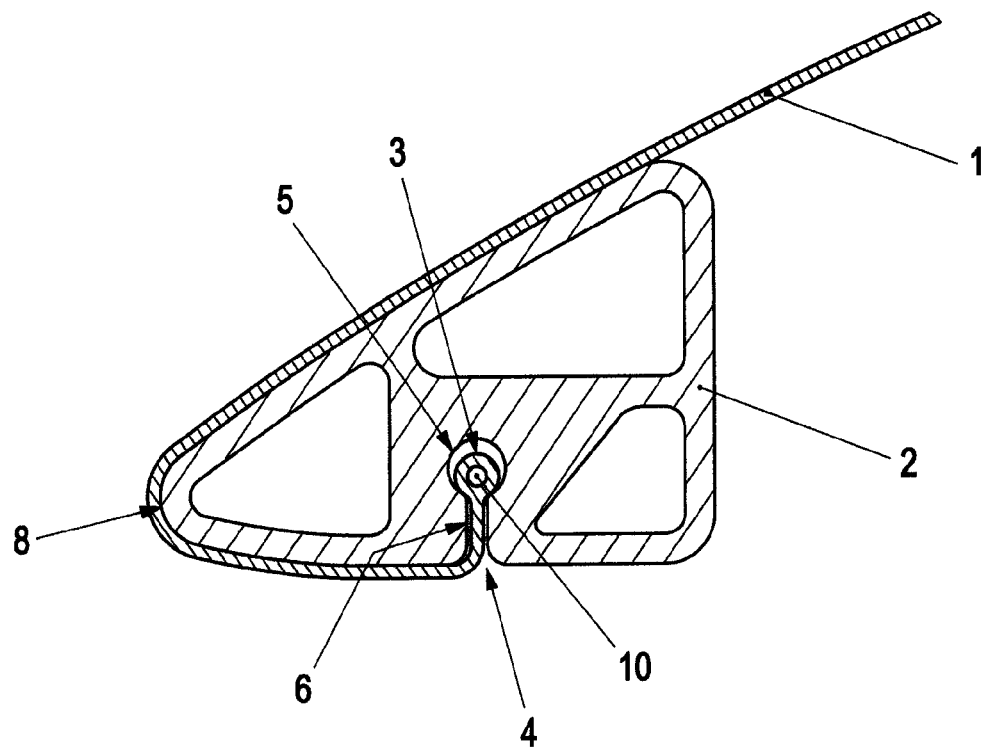
FIG. 4 illustrates a cross-sectional view of the rear portion of the cover and either a corner area or a leg of the tension bow with a tensioning cable and a corresponding area of the rear portion of the cover connected thereto being held within the receptacle of the tension bow.
Figure 5:
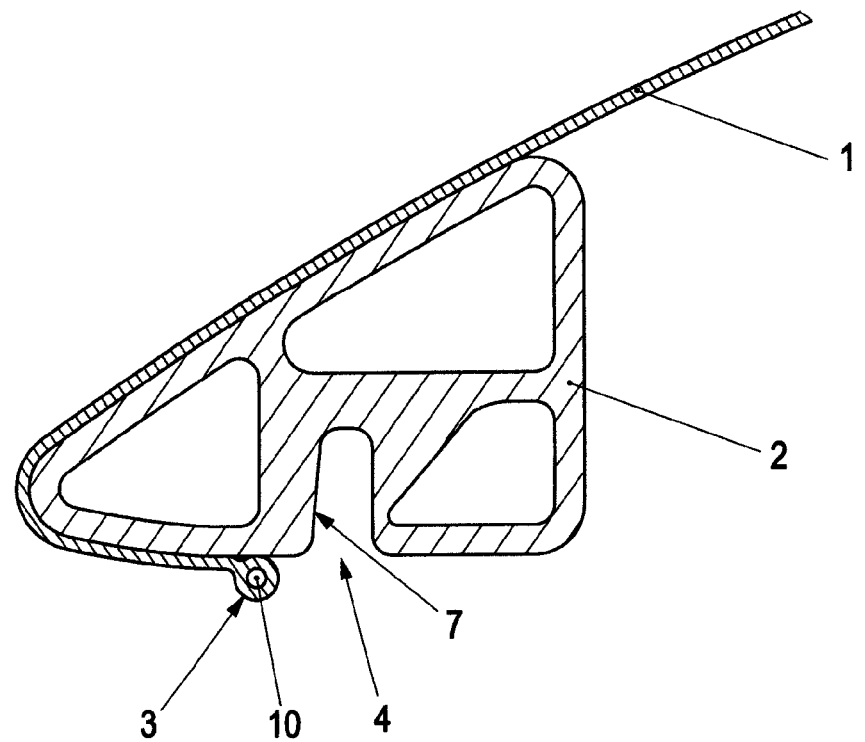
FIG. 5 illustrates a cross-sectional view of the rear portion of the cover and the middle part of the tension bow with the tensioning cable and a corresponding end area of the rear portion of the cover connected thereto being displaced from the receptacle of the tension bow.

Referring now to FIGS. 4 and 4, within continual reference to FIGS. 1, 2, and 3, cross-sectional views of rear portion 3 of cover 1 and tension bow 2 are shown. FIG. 4 illustrates a cross-sectional view of one of the end areas of rear portion 3 of cover 1 and either a corner area 21 or a leg 9 of tension bow 2. In FIG. 4, tensioning cable 10 and the end area of rear portion 3 of cover 1 connected thereto are held within receptacle 4 of tension bow 2. As described above, this arrangement occurs regardless of whether the folding top is closing or opening or whether the folding top is in the closed or opened position. FIG. 5 illustrates a cross-sectional view of the central area of rear portion 3 of cover 1 and center bar 22 of tension bow 2. In FIG. 5, tensioning cable 10 and the central area of rear portion 3 of cover 1 connected thereto are out of receptacle 4 of tension bow 2. As described above, this arrangement occurs when the folding top is closing or opening.

Tension bow 2 includes an extruded light metal profile. All edges coming in contact with cover 1 have relatively large radii. Receptacle 4 runs along tension bow 2 on a bottom side of tension bow 2 as shown in FIGS. 4 and 5.

As shown in FIG. 4, along legs 9 and corner areas 21 of tension bow 2, receptacle 4 includes a reduced slot-shaped opening 6. The width of slot-shaped opening 6 approximately corresponds to the thickness of cover 1. The base of receptacle 4 is circularly enlarged to hold rear portion 3 of cover 1 whereby rear portion 3 of cover 1 is wrapped around tensioning cable 10. Tensioning cable 10 and rear portion 3 of cover 1 wrapped around tensioning cable 10, taken together, have a cross-section considerably larger than slot-shaped opening 6 of receptacle 4. This prevents the end areas of rear portion 3 of cover 1 from sliding out of receptacle 4 via slot-shaped opening 6 and thus ensuring secure positioning in receptacle 4.

As shown in FIGS. 4 and 5, the ends of rear portion 3 of cover 1 wrapped around tensioning cable 10 is circularly enlarged. Other profile cross-sections can be used. For assembly, the circularly enlarged ends 5 of rear portion 3 of cover 1 with tensioning cable 10 arranged therein have to be pushed into receptacle 4 along legs 9 and corner areas 21 of tension bow 2 from the side.

As shown in FIG. 5, along center bar 22 of tension bow 2, receptacle 4 is in the shape of a widened opening 7. That is, slot-shaped opening 6 described in FIG. 4 is reshaped into widened opening 7 so that circular enlarged ends 5 of the central area of rear portion 3 of cover 1 can easily slide out of receptacle 4. As indicated above, FIG. 5 illustrates the arrangement of rear portion 3 of cover 1 adjacent to center bar 2 of tension bow 2 when the folding top is closing or opening. Here, the central area of rear portion 3 of cover 1 with tensioning cable 10 are partly pushed around rear edge 8 of tension bow 2.

When the folding top is closed and tension bow 2 is completely lowered, tensioning cable 10, rear portion 3 of cover 1 with circular enlargement 5, and receptacle 4 in tension bow 2 are arranged to lie vertically on top of one another. That is, tensioning cable 10 with rear portion 3 of cover 1 are located completely inside receptacle 4 along the entire length of tension bow 2. Only once tension bow 2 swings into a raised position does tensioning cable 10 with the central area of rear portion 3 of cover 1 slide out of widened opening 7 as the upward swinging tension bow 2 applies considerably more tension to cover 1 during the swinging process than it does in the lowered position. This tensioning of cover 1 pulls tensioning cable 10 and the central area of rear portion 3 of cover 1 out of widened opening 7. The area covered when tensioning cable 10 slides out corresponds to the tension of cover 1 produced by the swinging of tension bow 2.

When tension bow 2 swings back, cover 1 lies on tension bow 2 with less tension. The area of tensioning cable 10 that is guided in and can move in side legs 9 and corner areas 21 of tension bow 2 and in receptacle 4, re-tightens the area f tensioning cable 10 that is not guided and pulls the central area of rear portion 3 of cover 1 into receptacle 4 until tensioning cable 10 is positioned so that it is arranged back in slot-shaped opening 6 and in widened opening 7.

Figure 6:
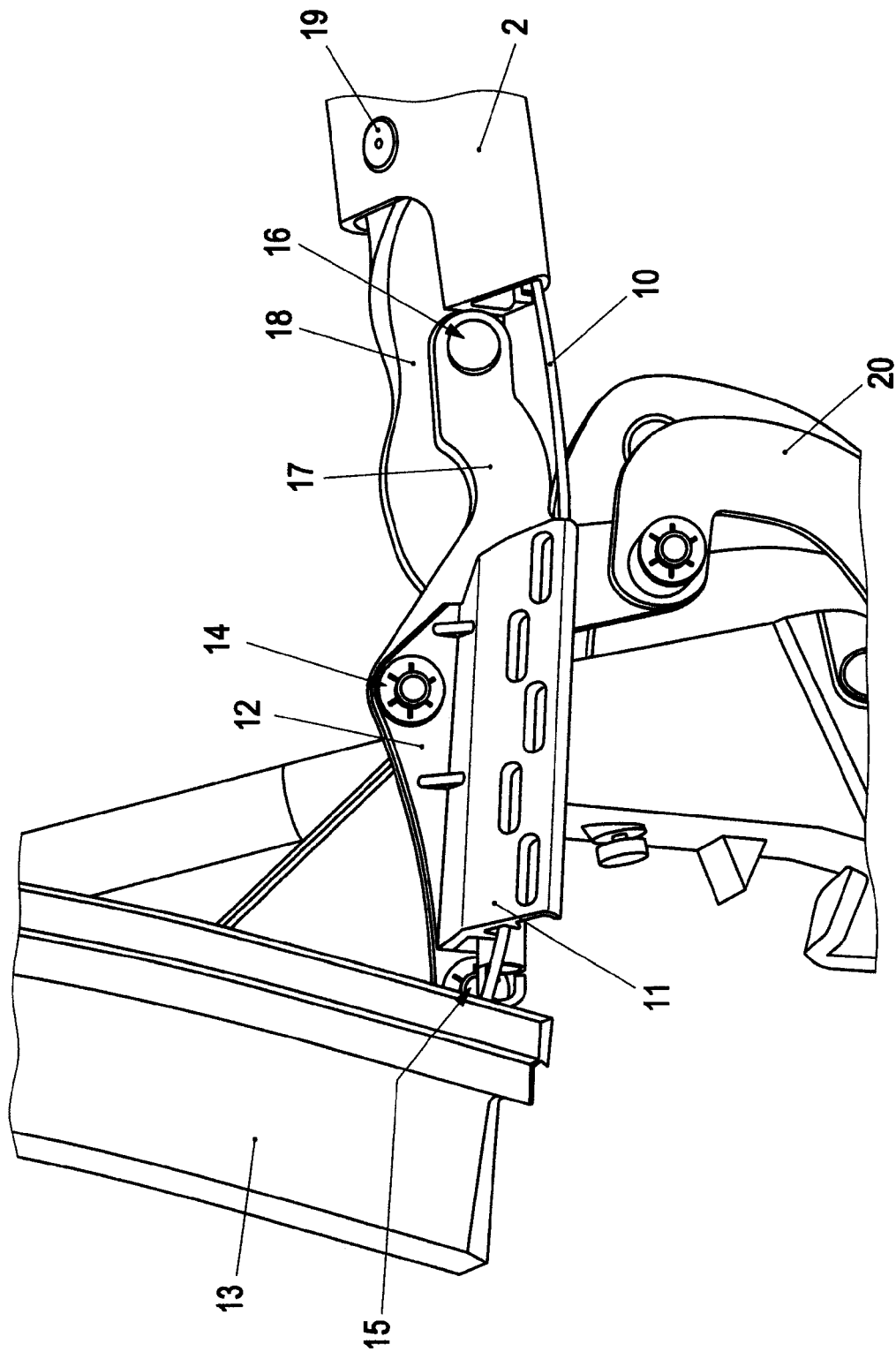
FIG. 6 illustrates the connection of the tension bow and the tensioning cable to the frame assembly of the folding top and the guidance of the tensioning cable by a rail.

Referring now to FIG. 6, the connection of tension bow 2 and tensioning cable 10 to the frame assembly of the folding top and the guidance of tensioning cable 10 by a rail 11 are shown. The ends of side legs 9 of tension bow 2 are coupled to respective control arm transmissions of the frame assembly of the folding top. In particular, each end of legs 9 of tension bow 2 is connected through a bell crank 18 by a rivet joint 19 or the like such as a bolt with a control arm 20 of the folding top transmission.

A coupling arm 17 connects bell crank 18 with C-pillar 13 or a main control arm at mounting points 15, 16. When tension bow 2 swings, coupling arm 17 controls superimposed longitudinal motions in or against the direction of forward vehicle travel, which are also possible in addition to the swinging motion. A rail 11 is at the middle of coupling arm 17. A flange 12 is on top of rail 11 and is pivotably attached at mounting point 14. The slope and course of the rail profile correspond to those of cover 1 in this area with cover 1 being fastened to rail 11. The bottom of rail 11 has a profiled shape to guide tensioning cable 10. If tension bow 2 swings into an upright position, coupling arm 17 and tensioning cable 10 guided beneath rail 11 swing rail 11 into a position adapted to the sloping position of tension bow 2, which is favored by the additional mobility of rail 11.

Each end of tensioning cable 10 is fastened to a respective C-pillar 13 or another control arm such as a main control arm of the frame assembly. This can be done by suspending the end of tensioning cable 10 in an eye located on a C-pillar 13 or by a bolt connection. Each end of tensioning cable 10 may be connected with a respective C-pillar 13 by a tension spring. This makes it possible to compensate for tolerances or to allow further stretching and thus additional displacement of rear portion 3 of cover 1.

Figure 7:
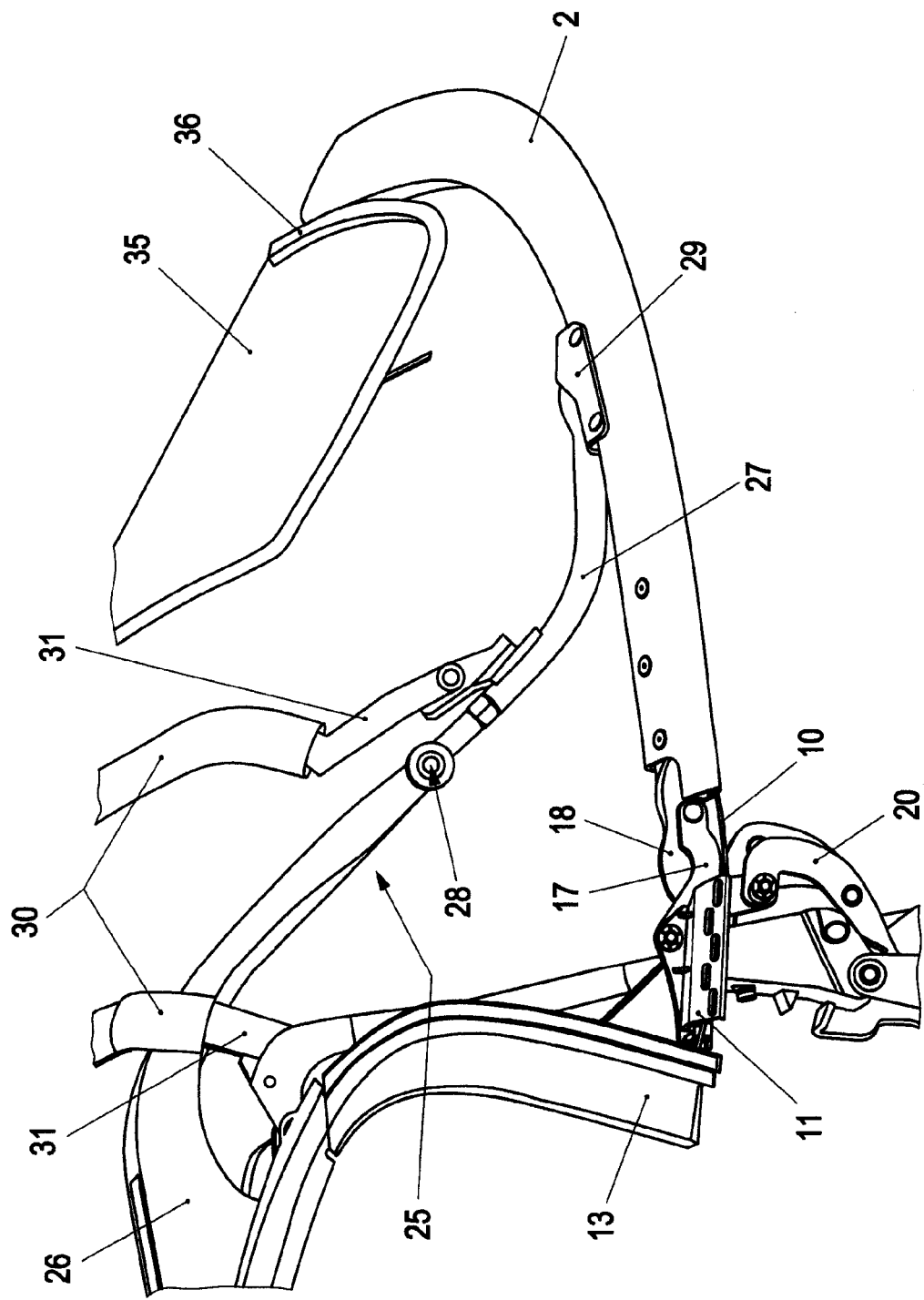
FIG. 7 illustrates a landau bar of the frame assembly and guidance of the tensioning cable by the rail with the folding top being in the closed position.

Referring now to FIG. 7, with continual reference to FIG. 6, the connection of tension bow 2 and tensioning cable 10 to the frame assembly of the folding top and the guidance of tensioning cable 10 by rail 11 will be described in greater detail. FIG. 7 illustrates the folding top in the closed position. The frame assembly includes a landau bar 25. Tensioning cable 10 is guided by rail 11 and landau bar 25. Landau bar 25 includes a front landau bar arm 26 and a rear landau bar arm 27. Front and rear landau bar arms 26, 27 are pivotably connected with one another through a joint 28 located at about the middle of landau bar 25.

Rear landau bar arm 27 is movably attached to tension bow 2 by a bracket 2. The front end of front landau bar arm 26 is pivotably connected with C-pillar 13 or a roof-side support. This part of front landau bar arm 26 can perform the swinging process of tension bow 2 so that when the folding top is opening landau bar arms 26, 27 move toward one another. If the folding top is closed, then tension bow 2 is lowered and the retention force for pre-tensioning cover 1 is transferred to tension bow 2 through landau bar 25. The pre-tensioning is caused by turning back cover 1 around rear end edge 8 of tension bow 2 and by tensioning cable 10 which is pulled into receptacle 4.

As shown in FIG. 7, cover 1 includes a rear window 35 which is freely integrated into cover 1 and is only held in its operating position by the tension of cover 1 along its frame 36. This also applies for transversely extending bows 30 of the frame assembly that gives shape to the folding top which also are only held in position by cover 1 and side bow brackets 31. The tensions to be applied in this way by cover 1 are applied through tension bow 2 and landau bar 25.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

| List of Reference Numbers |
| --- |
| 1 Cover |
| 2 Tension bow |
| 3 Rear portion of cover |
| 4 Groove, groove-shaped receptacle |
| 5 Circular recess (enlarged) |
| 6 Slot-shaped opening |
| 7 Widened slot-shaped opening |
| 8 Rear edge of tensioning bow |
| 9 Legs |
| 10 Tensioning cable, sealing strip |
| 11 Rail |
| 12 Flange |
| 13 C-pillar |
| 14 Mounting point |
| 15 Mounting point |
| 16 Mounting point |
| 17 Coupling arm, connecting arm |
| 18 Bell crank |
| 19 Rivet |
| 20 Control arm |
| 21 Corner area |
| 22 Center bar |
| 25 Landau bar |
| 26 Front landau bar arm |
| 27 Rear landau bar arm |
| 28 Joint |
| 29 Bracket |
| 30 Bow |
| 31 Side bow bracket |
| 35 Rear window (HKS) |
| 36 Frame |

What is claimed is:

1. A vehicle folding top having changeable cover tension, the folding top comprising:
    a cover;
    a frame assembly, wherein the cover is stretched over the frame assembly and the frame assembly is movable to move the cover between a closed position and an opened position;
    a U-shaped tension bow having a center bar, a pair of side legs, a wide groove running along the center bar, and a narrow groove running along each side leg, wherein the side legs are connected to the frame assembly;
    a tensioning cable running along the tension bow and fixedly connected to a rear portion of the cover, wherein the tensioning cable is connected at respective ends to the frame assembly; and
    a landau bar connected between the frame assembly and the tension bow, wherein the landau bar swings the tension bow from a lowered position to a raised position as the cover moves from either the closed position or the opened position to an intermediate position between the closed and opened positions, wherein the landau bar swings the tension bow from the raised position to the lowered position as the cover moves from an intermediate position between the closed and opened positions to either the closed position or the opened position;

wherein a central area of the rear portion of the cover along with the tensioning cable connected thereto are removably held within the wide groove of the center bar of the tension bow such that the central area of the rear portion of the cover is connected to the tension bow when the tension bow is in the lowered position whereby the center bar of the tension bow applies tension to the cover when the cover is in either the closed position or the opened position and such that the central area of the rear portion of the cover is disconnected from the tension bow when the tension bow is in the raised position whereby the center bar of the tension bow does not apply tension to the cover as the cover moves between the closed and opened positions.

2. The folding top of claim 1 wherein:

end areas of the rear portion of the cover along with the tensioning cable connected thereto are fixedly held within the narrow grooves of the side legs of the tension bow such that the end areas of the rear portion of the cover are connected to the tension bow regardless of whether the tension bow is in the lowered position or the raised position whereby the side legs of the tension bow apply tension to the cover irrespective of whether or not the cover is moving between the closed and opened positions.

3. The folding top of claim 1 wherein:

the wide groove extends along the bottom of the center bar of the tension bow and the narrow grooves extend along the bottom of the side legs of the tension bow.

4. The folding top of claim 1 wherein:

each groove has a circular recess along the base of the groove.

5. The folding top of claim 4 wherein:

the cross-section of the wide groove is U-shaped.

6. The folding top of claim 4 wherein:

the cross-section of each narrow groove is tear shaped.

7. The folding top of claim 1 wherein:

the frame assembly includes a respective pivotably movable rail for each end of the tensioning cable, wherein the ends of the tensioning cable are guided beneath the respective rails.

8. The folding top of claim 1 wherein:

the central area of the rear portion of the cover along with the tensioning cable connected thereto slide out of the wide groove of the center bar of the tension bow as the tension bow moves from the lowered position to the raised position.

9. The folding top of claim 8 wherein:

the central area of the rear portion of the cover along with the tensioning cable connected thereto slide into the wide groove of the center bar of the tension bow as the tension bow moves from the raised position to the lowered position.

10. The folding top of claim 1 wherein:

the cover is a soft cloth.

11. A vehicle comprising:

a vehicle body;

a cover;

a frame assembly movably connected to the vehicle body, wherein the cover is stretched over the frame assembly and the frame assembly is movable to move the cover between a closed position in which the cover covers a passenger compartment of the vehicle body and an opened position in which the cover uncovers the passenger compartment of the vehicle body;

a U-shaped tension bow having a center bar, a pair of side legs, a wide groove running along the center bar, and a narrow groove running along each side leg, wherein the side legs are connected to the frame assembly;

a tensioning cable running along the tension bow and fixedly connected to a rear portion of the cover, wherein the tensioning cable is connected at respective ends to the frame assembly; and a landau bar connected between the frame assembly and the tension bow, wherein the landau bar swings the tension bow from a lowered position to a raised position as the cover moves from either the closed position or the opened position to an intermediate position between the closed and opened positions, wherein the landau bar swings the tension bow from the raised position to the lowered position as the cover moves from an intermediate position between the closed and opened positions to either the closed position or the opened position;

wherein a central area of the rear portion of the cover along with the tensioning cable connected thereto are removably held within the wide groove of the center bar of the tension bow such that the central area of the rear portion of the cover is connected to the tension bow when the tension bow is in the lowered position whereby the center bar of the tension bow applies tension to the cover when the cover is in either the closed position or the opened position and such that the central area of the rear portion of the cover is disconnected from the tension bow when the tension bow is in the raised position whereby the center bar of the tension bow does not apply tension to the cover as the cover moves between the closed and opened positions.

12. The vehicle of claim 11 wherein:

end areas of the rear portion of the cover along with the tensioning cable connected thereto are fixedly held within the narrow grooves of the side legs of the tension bow such that the end areas of the rear portion of the cover are connected to the tension bow regardless of whether the tension bow is in the lowered position or the raised position whereby the side legs of the tension bow apply tension to the cover irrespective of whether or not the cover is moving between the closed and opened positions.

13. The vehicle of claim 11 wherein:

the wide groove extends along the bottom of the center bar of the tension bow and the narrow grooves extend along the bottom of the side legs of the tension bow.

14. The vehicle of claim 11 wherein:

each groove has a circular recess along the base of the groove.

15. The vehicle of claim 14 wherein:

the cross-section of the wide groove is U-shaped.

16. The vehicle of claim 14 wherein:

the cross-section of each narrow groove is tear shaped.

17. The vehicle of claim 11 wherein:

the frame assembly includes a respective pivotably movable rail for each end of the tensioning cable, wherein the ends of the tensioning cable are guided beneath the respective rails.

18. The vehicle of claim 11 wherein:

the central area of the rear portion of the cover along with the tensioning cable connected thereto slide out of the wide groove of the center bar of the tension bow as the tension bow moves from the lowered position to the raised position.

19. The vehicle of claim 18 wherein:

the central area of the rear portion of the cover along with the tensioning cable connected thereto slide into the wide groove of the center bar of the tension bow as the tension bow moves from the raised position to the lowered position.

20. The vehicle of claim 11 wherein:

the cover is a soft cloth.

* * * * *